US009664513B2

United States Patent
Gongola et al.

(10) Patent No.: US 9,664,513 B2
(45) Date of Patent: May 30, 2017

(54) GLOBE CLAMP WITH LEVEL MOUNT

(71) Applicants: Paul John Gongola, Enfield, CT (US); Sean Michael Blondin, East Granby, CT (US)

(72) Inventors: Paul John Gongola, Enfield, CT (US); Sean Michael Blondin, East Granby, CT (US)

(73) Assignee: Cooper Technologies Company, Houston, TX (US)

( * ) Notice: Subject to any disclaimer, the term of this patent is extended or adjusted under 35 U.S.C. 154(b) by 313 days.

(21) Appl. No.: 14/320,121

(22) Filed: Jun. 30, 2014

(65) Prior Publication Data

US 2015/0377463 A1     Dec. 31, 2015

(51) Int. Cl.
| | |
|---|---|
| *G01C 9/24* | (2006.01) |
| *F16B 1/00* | (2006.01) |
| *F21V 21/08* | (2006.01) |
| *F21V 21/12* | (2006.01) |
| *G01C 9/26* | (2006.01) |

(52) U.S. Cl.
CPC ............. *G01C 9/24* (2013.01); *F16B 1/00* (2013.01); *F21V 21/08* (2013.01); *F21V 21/12* (2013.01); *G01C 9/26* (2013.01)

(58) Field of Classification Search
CPC ....... F21W 2111/06; G01C 9/24; F21V 21/08; F21V 21/10; F21V 21/12; F21V 33/006; F21K 9/135; E01F 9/559; F16B 1/00; F21S 6/005; F21S 8/08; F21S 8/081; F21S 8/083
See application file for complete search history.

(56) References Cited

U.S. PATENT DOCUMENTS

| | | | |
|---|---|---|---|
| 3,501,627 | A | 3/1970 | Macemon |
| 3,596,081 | A | 7/1971 | Higgins |
| 4,104,711 | A | 8/1978 | Carter |
| 4,499,527 | A | 2/1985 | Tauber et al. |
| 4,521,836 | A | 6/1985 | Puttemanns et al. |
| 4,638,411 | A | 1/1987 | Trainor |

(Continued)

FOREIGN PATENT DOCUMENTS

| | | |
|---|---|---|
| RU | 2115859 | 7/1998 |
| WO | 2012047211 | 4/2012 |

OTHER PUBLICATIONS

Lukashina, E., International Search Report and Written Opinion of the International Searching Authority for PCT/US2015/038261, completed Sep. 16, 2015, mailed Sep. 24, 2015, pp. 1-6.

*Primary Examiner* — Peggy Neils
*Assistant Examiner* — William N Harris
(74) *Attorney, Agent, or Firm* — King & Spalding LLP

(57) ABSTRACT

The present disclosure provides a globe clamp with integrated mounting pads which can hold a level while a user adjusts the lighting device to which the globe clamp is coupled. In one example embodiment, the globe clamp includes a clamp body, which includes a top portion, a bottom portion, and an exterior contour. The top portion forms a first internal opening defined by a first inner surface. The bottom portion forms a second internal opening defined by a second inner surface. The exterior contour surrounds the top portion and the bottom portion. The exterior contour comprises at least one recess having a horizontal, flat surface, the recess configured to retain a level.

18 Claims, 2 Drawing Sheets

(56) References Cited

U.S. PATENT DOCUMENTS

| | | | |
|---|---|---|---|
| 5,144,540 A | 9/1992 | Hayes | |
| 5,414,607 A * | 5/1995 | Harris | F21S 8/081 |
| | | | 362/362 |
| 5,594,201 A * | 1/1997 | Reinert, Sr. | B64F 1/20 |
| | | | 174/37 |
| 7,175,297 B2 | 2/2007 | Hagen | |
| 7,192,155 B2 | 3/2007 | Morrow et al. | |
| 7,217,006 B2 | 5/2007 | Trenchard et al. | |
| 7,503,669 B2 | 3/2009 | Rizkin et al. | |
| 7,534,009 B2 | 5/2009 | Trojanowski et al. | |
| 8,511,858 B2 | 8/2013 | Morrow | |
| 8,827,512 B1 * | 9/2014 | Beadle | F21S 8/083 |
| | | | 362/153 |
| 2005/0110649 A1 * | 5/2005 | Fredericks | B64D 47/06 |
| | | | 340/815.45 |
| 2007/0121329 A1 | 5/2007 | Morrow et al. | |
| 2012/0236558 A1 * | 9/2012 | Roudeski | F21S 8/032 |
| | | | 362/235 |
| 2012/0327639 A1 * | 12/2012 | Chen | F21S 9/035 |
| | | | 362/183 |

* cited by examiner

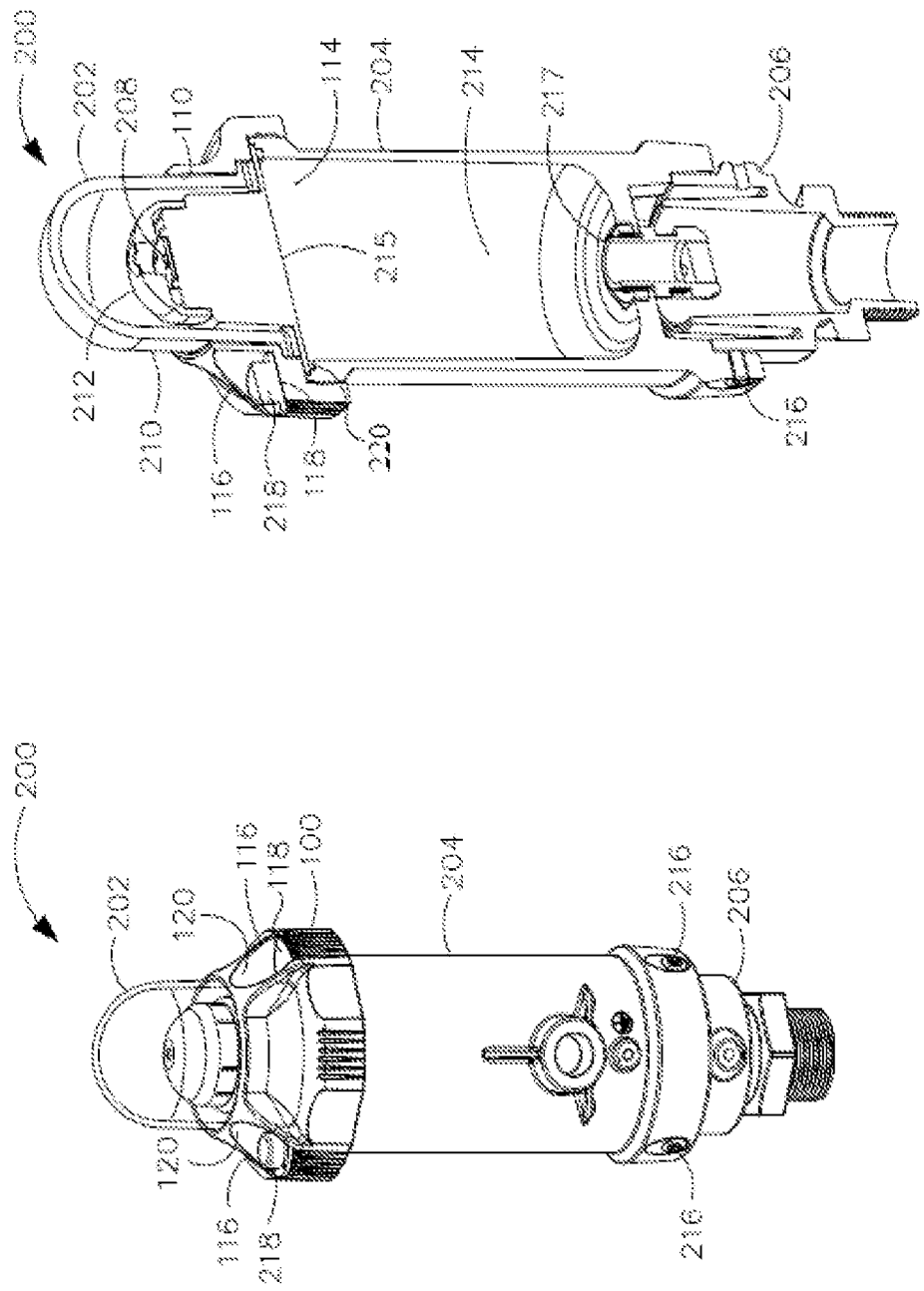

US 9,664,513 B2

GLOBE CLAMP WITH LEVEL MOUNT

TECHNICAL FIELD

The present disclosure relates generally to a globe clamp for an elevated lighting fixture. Specifically, the present disclosure relates to a globe clamp with integrated level mounting pads.

BACKGROUND

Elevated lighting fixtures for airfield applications are required by the Federal Aviation Administration (FAA) to have 4 degrees of adjustability in all directions after the lighting fixture is installed, which allows the lighting fixture to be leveled. This allows the light emitted from the lighting fixtures to be aligned in the correct direction. The underground support for these lighting fixtures may not be perfectly leveled or may shift overtime. Thus, having an adjustment range allows the lighting fixture to be adjusted into a position which compensates for the misalignment of the support. In certain example embodiments, the light fixture comprises one or more segments which couple together and ultimately couple to the underground support. The adjustment means may be implemented at one or more of the junctions of these segments. For example, a plurality of set screws may be used to couple a housing or support to a coupler, in which the lighting device is coupled to the other end of the housing. The configuration of the set screws may provide adjustability between the housing and the coupler, allowing the lighting device to leveled and set in the correct position. However, in order to level the lighting device, an operator must be able to receive feedback regarding whether or not the lighting device is level. Thus, a commercial bubble level is typically attached to the lighting device. The commercial bubble level is usually attached to the lighting device via a separate device, such as a level holder or ring for supporting the level. This means that the operator must attach the separate device to the lighting device each time and remove the separate device when finished with the leveling process. The operator may need to repeat this process for each lighting fixture. This results in extra time spent performing the task, the cost of the separate device, and added error margin due to the attachment of the separate device.

SUMMARY

According to one aspect of the present disclosure, a globe clamp includes a clamp body, which includes a top portion, a bottom portion, and an exterior contour. The top portion forms a first internal opening in which the first internal opening is defined by a first inner surface. The bottom portion forms a second internal opening in which the second internal opening is defined by a second inner surface. The exterior contour surrounds the top portion and the bottom portion. The exterior contour comprises at least one recess having a flat, horizontal surface, the at least one recess configured to retain a level.

According to another aspect of the present disclosure, a light holder includes a top portion and a bottom portion. The top portion includes a first exterior contour and a first interior surface. The first interior surface defines a first tubular opening, in which the first tubular opening traverses the top portion and is defined by a central axis. The first tubular opening is configured to receive a lighting device. The bottom portion is coupled to the top portion. The bottom portion includes a second exterior contour and a second interior surface. The second interior surface defines a second tubular opening. The second tubular opening traverses the bottom portion. The second tubular opening is configured to receive and couple to a support via the second interior surface. At least one of the first exterior contour and the second exterior contour comprises a recessed portion having a flat surface, the flat surface perpendicular to the central vertical axis.

According to yet another aspect of the present disclosure, a fixture clamp comprises a top coupling portion, a bottom coupling portion, and an exterior contour. The top coupling portion is configured to couple to and support a fixture. The bottom coupling portion is configured to mount to a support structure. The exterior contour includes at least one level holder, the level holder having a flat surface and at least one raised wall, wherein the level holder is configured to retain a level therein.

BRIEF DESCRIPTION OF THE DRAWINGS

For a more complete understanding of the disclosure and the advantages thereof, reference is now made to the following description, in conjunction with the accompanying figures briefly described as follows:

FIG. 2 illustrates a perspective view of a lighting fixture with the globe clamp with integrated level mounting pads, in accordance with example embodiments of the present disclosure; and FIG. 3 illustrates a cross-sectional view of the lighting fixture of FIG. 2, in accordance with example embodiments of the present disclosure.

Figure 1:
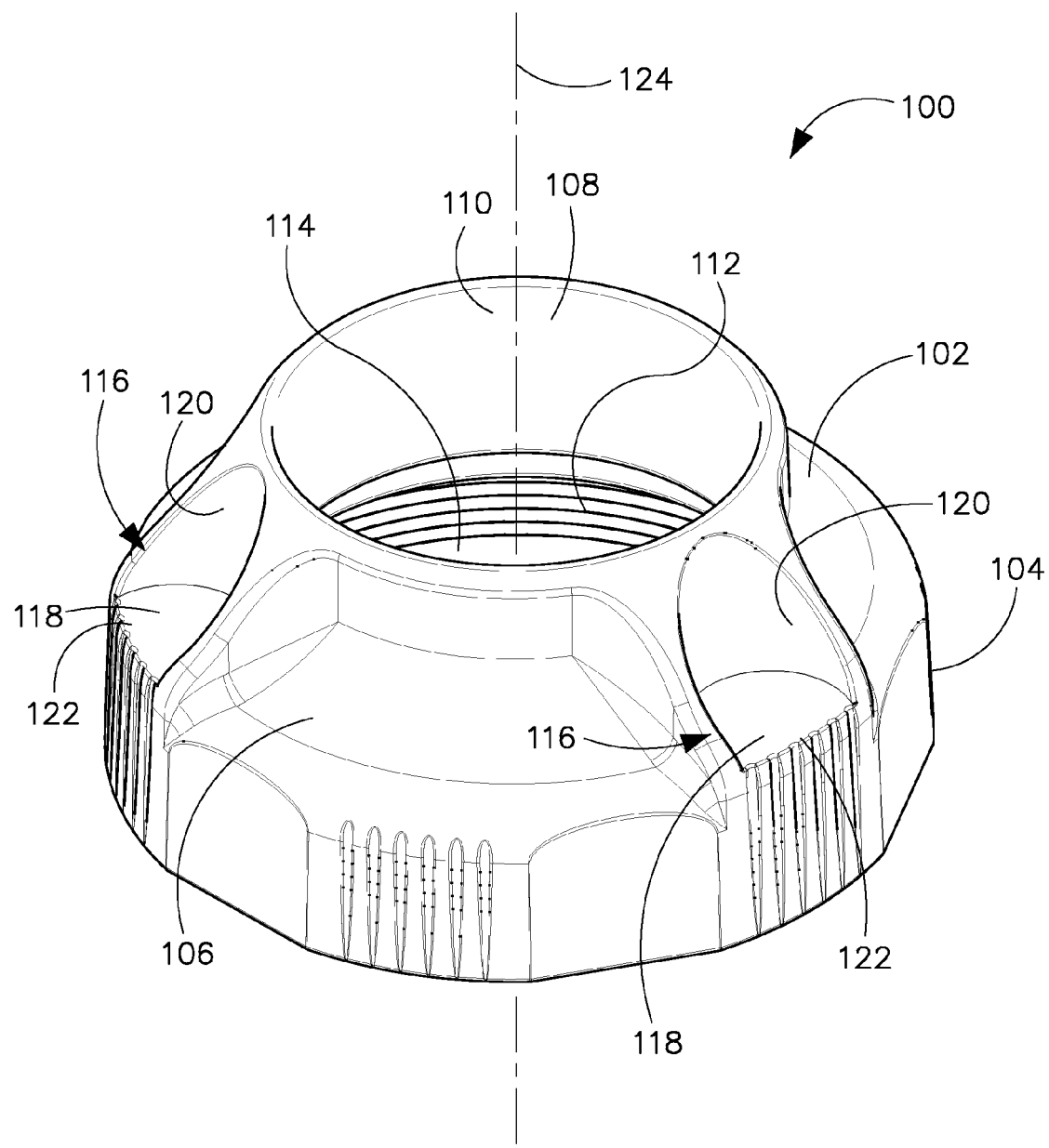
FIG. 1 illustrates a globe clamp with integrated level mounting pads, in accordance with example embodiments of the present disclosure.

The drawings illustrate only example embodiments of the disclosure and are therefore not to be considered limiting of its scope, as the disclosure may admit to other equally effective embodiments. The elements and features shown in the drawings are not necessarily to scale, emphasis instead being placed upon clearly illustrating the principles of example embodiments of the present disclosure. Additionally, certain dimensions may be exaggerated to help visually convey such principles.

DETAILED DESCRIPTION OF EXAMPLE EMBODIMENTS

In the following paragraphs, the present disclosure will be described in further detail by way of examples with reference to the attached drawings. In the description, well known components, methods, and/or processing techniques are omitted or briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s). The present disclosure provides a globe clamp which comprises an integrated mounting pad which temporarily holds a commercial level without the need for addition attachment mechanisms or accessories.

As described above, elevated lighting devices often need to be leveled during installation or subsequent maintenance in order to ensure proper alignment of the lighting device and the direction of the emitted light. The present disclosure provides a clamp, or a coupling which, in certain embodiments, holds a light source and couples the light source to a support structure. The support structure may have a slight adjustability of a few degrees (e.g., +/−4° minimum) in all directions, which allows the lighting device to be moved and stabilized within that adjustability range. Since, in certain example embodiments, the goal of adjusting the lighting device is to level the lighting device, a commercially-available bubble level is attached somewhere on the lighting device to provide feedback. The globe clamp disclosed herein includes an integrated mounting pad which can hold a level while a user adjusts the lighting device, providing immediate feedback. Specifically, the user can simply place a commercial level, such as a circular bubble level, onto the mounting pad when performing adjustments, and remove the level when finished. Since the globe clamp does not require additional accessories to hold a level, the leveling process becomes more convenient, time efficient, and cost-saving. The results may even be more accurate since potential error introduced by having to attach an additional leveling accessory to the lighting device is removed.

Turning to the drawings, FIG. 1 illustrates a globe clamp 100 with integrated level mounting pads, in accordance with example embodiments of the present disclosure. Referring to FIG. 1, the globe clamp 100 includes a clamp body having a top portion 102 and a bottom portion 104 coupled to the top portion. The clamp body further includes an exterior contour 106. In certain example embodiments, the top portion 102 and the bottom portion 104 are integral and continuous. In certain embodiments, the exterior contour 106 can include one or more depressions as shown in FIG. 1. The depressions along exterior contour 106 can assist with gripping the globe clamp. In other embodiments, the exterior contour 106 can take other forms such as a flat angled surface that is continuous from the top portion 102 to the bottom portion 104. In the example shown in FIG. 1, the outer surface of the bottom portion 104 also includes alternating flat faces and grooved surfaces for gripping the clamp. In alternate embodiments, the flat faces and grooved surfaces can take other forms and configurations. In certain example embodiments, the top portion 102 includes a first inner surface 108, which defines a first internal opening 110. Likewise, the bottom portion 104 includes a second internal surface 112 which defines a second internal opening 114. In certain example embodiments, the first internal opening 110 is joined with the second internal opening 114 such that the first and second internal openings make up a continuous opening traversing the clamp body. In certain example embodiments, the top portion 102 and the bottom portion 104 are integrally formed and parts of the same body rather than separate parts that are joined together.

In certain example embodiments, the first internal opening 110 is a tubular or round opening. In other example embodiments, the first internal opening 110 is a rectangular or square opening. In yet other example embodiments, the first internal opening 110 has another regular, irregular, geometric, or non-geometric shape. Likewise, the second internal opening 114 can be tubular or round, square or rectangle, or any other regular, irregular, geometric, or non-geometric shape. In certain example embodiments, the first internal opening 110 and the second internal opening 114 are separated such that the first internal opening 110 is a recess in the top portion 102 of the clamp body opening upwards and the second internal opening 114 is a recess in the bottom portion 104 of the clamp body opening downward in the opposite direction of the first internal opening 110.

In certain example embodiments, the second inner surface 112 has threads provided therein for coupling to a support structure received in the second internal opening 114. In certain example embodiments, the second inner surface 112 of the bottom portion 104 provides another coupling mechanism or coupling means for coupling to a support structure in order to mount the globe clamp 100 onto the support structure. In certain example embodiments, the support structure is a housing, a column, a stand, a mount, a riser, or other structure and supports the globe clamp 100. In certain example embodiments, the second internal opening 114 has a larger dimension or perimeter than does the first internal opening 110. For example, in certain embodiments in which the first internal opening 110 and the second internal opening 114 are tubular shaped, the second internal opening 114 may have a larger diameter than does the first internal opening 110. In certain example embodiments, the first internal opening 110 and the second internal opening 114 share a central vertical axis 124 that is parallel to the longitudinal axis of the light fixture to which the globe clamp is coupled.

In certain example embodiments, the globe clamp 100 includes one or more level mounts 116. In certain example embodiments, the level mounts 116 are integrated into the exterior contour 106 of the globe clamp 100. In certain example embodiments, the level mount is a recessed portion of the exterior contour 106. The level mount 116 includes a flat surface 118 on which the level will sit. In certain example embodiments, the level mount 116 includes a wall 120 extending from at least a portion of the perimeter of the flat surface 118. In certain example embodiments, the shape of the flat surface and the wall 120 correspond to a profile or shape of the level such that the level fits within the level mount 116 and is at least partially retained within the level mount 116. In certain example embodiments, the globe clamp 110 includes one or a plurality of level mounts 116 disposed at various locations about the globe clamp 110. In certain example embodiments, the level mount 116 includes a reduced edge 122 which allows a portion of the level to hang off, making it easy to place the level in the level mount 116 and remove the level from the level mount 116. In certain example embodiments, the wall 120 encircles the entire flat surface 118. In certain example embodiments, one or more protrusions (not shown) extend from portions of the perimeter of the flat surface 118, the protrusions configured to retain the level, similar to the function of the wall 120.

In certain example embodiments, the flat surface 118 of the level mount 116 is horizontal with respect to the ground where the lighting device is mounted. Described another way, the flat surface 118 defines a plane that is perpendicular to the central vertical axis 124 of the first internal opening 100, the second internal opening 114, or both. In certain example embodiments, the flat surface 118 is perpendicular to at least a portion of the first inside surface 108.

FIG. 2 illustrates a perspective view of the globe clamp 100 of FIG. 1 as used in a light fixture 200, in accordance with example embodiments of the present disclosure. FIG. 3 illustrates a cross-sectional view of the globe clamp 100 and light fixture 200 of FIG. 2. Referring to FIGS. 2 and 3, in certain example embodiments, the lighting fixture 200 includes the globe clamp 100, a lighting device 202, and a housing 204. In certain example embodiments, the lighting fixture 200 further includes a coupler 206. In certain example embodiments, the lighting device 202 is partially disposed within the first internal opening 110. In certain example embodiments, the lighting device 202 includes a light source 208. In certain example embodiments, the light source 208 and the flat surface 118 of the level mount 116 are substantially parallel. In certain example embodiments the lighting device 202 is a globe light. In certain such example embodiments, the lighting device 202 includes a color globe 210, a lens 212, and an LED as the light source 208. The lighting device 202 may further include a heat-sink 215 for dissipating heat generated by the light source 208.

In certain example embodiments, the globe clamp 100 is coupled to the housing 204 via the second internal opening 114. In certain example embodiments, the globe clamp 100 screws onto the housing 204 via mating threads on the second inner surface and corresponding mating threads on the housing 204. In certain example embodiments, the globe clamp 100 couples to the housing 204 via other coupling mechanisms such as snaps, fittings, and the like. In certain example embodiments, a portion of the lighting device 202 is disposed on top of the housing 204 with an edge secured between the globe clamp 100 and the housing 204. In certain example embodiments, a seal 220 is disposed between the lighting device 202 and the housing 204 such that the junction is sealed. In certain example embodiments, the housing 204 includes an inner chamber 214 in which various electronics, such as a power supply (not shown), can be disposed. In certain example embodiments, the housing 204 further includes a cord fitting 217 through which electronic wires can pass to connect to the electronics within the inner chamber 214 and equipment located below the lighting fixture 200.

In certain example embodiments, the housing 204 is coupled to the coupler 206 via a plurality of set screws 216. Thus, the housing 204 can be adjusted to a certain degree relative to the coupler 206. During adjustment, a user can position the housing 204 relative to the coupler while a level 218 is placed in the level mount 116. The user can adjust the position of the housing while observing the level and secure the set screws when the housing 204 is in a position such that the level 218 indicates the housing is level. In certain example embodiments, the level 218 is a commercially-available radial bubble level. In certain other example embodiments, the level 218 can be any other existing or new type of level suitable for the applications described herein.

Although embodiments of the present disclosure have been described herein in detail, the descriptions are by way of example. The features of the disclosure described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

What is claimed is:

1. A globe clamp, comprising:
a top portion comprising a top outer surface and a top inner surface,
wherein the top inner surface defines a first internal opening,
wherein the top outer surface extends and widens from a top outer annular edge towards a bottom portion of the globe clamp,
wherein the top outer surface of the top portion defines an exterior contour that comprises one or more depressions and at least one level mount disposed between the one or more depressions,
wherein the at least one level mount comprises a recess having a horizontal, flat surface, and
wherein the at least one level mount comprises a reduced outer edge such that when a level is disposed within the recess on the horizontal, flat surface, at least a portion of the level extends and hangs off the reduced outer edge;
the bottom portion comprising a bottom outer surface and a bottom inner surface, the bottom outer surface extending substantially vertically upwards from a bottom outer annular edge towards the top outer surface and the bottom inner surface extending from a bottom inner annular edge towards the top inner surface,
wherein the bottom portion is larger in diameter than the top portion, and
wherein the bottom inner surface defines a second internal opening that is axially aligned with the first internal opening.

2. The globe clamp of claim 1, wherein the first and second internal openings are tubular openings.

3. The globe clamp of claim 1, wherein the horizontal, flat surface is substantially round and the recess is at least partially surrounded by a raised wall.

4. The globe clamp of claim 1, wherein the bottom portion is configured to mount onto a support structure, and wherein the bottom portion comprises a coupling mechanism configured to couple to the support structure.

5. The globe clamp of claim 4, wherein the coupling mechanism comprises a threaded surface.

6. The globe clamp of claim 1, wherein the horizontal, flat surface comprises a perimeter, wherein a raised wall extends orthogonally from a portion of the perimeter.

7. The globe clamp of claim 1, wherein the second internal opening has a larger perimeter than does the first internal opening.

8. The globe clamp of claim 1, wherein the top portion is configured to receive and couple to a globe light.

9. An airfield light fixture, comprising:
a housing defining an inner chamber that is configured to house one or more electronic devices associated with the airfield light fixture;
a globe clamp comprising:
a top portion comprising:
an first exterior contour; and
a first interior surface, the first interior surface defining a first tubular opening, the first tubular opening traversing the top portion and defined by a central vertical axis, wherein the first tubular opening is configured to receive a lighting device; and
a bottom portion coupled to the top portion, the bottom portion comprising:
a second exterior contour; and
a second interior surface; the second interior surface defining a second tubular opening, the second tubular opening traversing the bottom portion, wherein the second tubular opening is configured to receive and couple to a proximal end of the housing via the second interior surface,
wherein the first exterior contour comprises a recessed portion having a flat surface that is configured to receive a level, the flat surface perpendicular to the central vertical axis, and
a coupler that is coupled to a distal end of the housing using one or more threaded fasteners such that the housing and the globe clamp coupled to the housing are adjustable with respect to the coupler when the one or more threaded fasteners are loosened and the housing and the globe clamp are locked in place when the one or more threaded fasteners are tightened.

10. The airfield light fixture of claim 9, wherein the top portion and bottom portion are integrally formed and continuous.

11. The airfield light fixture of claim 9, wherein the flat surface is at least semi-surrounded by a raised wall.

12. The airfield light fixture of claim 9, wherein the recessed portion is configured to retain a bubble level.

13. The airfield light fixture of claim 9, wherein the second interior surface comprises a plurality of mating threads.

14. The airfield light fixture of claim 9, wherein the first tubular opening and the second tubular opening are coupled and the central vertical axis is common to both.

15. The airfield light fixture of claim 9, wherein the recessed portion is partially bound by a wall and partially unbound.

16. A fixture clamp, comprising:
    a clamp body that includes:
        a top coupling portion configured to couple to and support a fixture;
        a bottom coupling portion configured to mount to a support structure; and
        an exterior contour comprising at least one level holder, the level holder having a flat surface and at least one raised wall, wherein the at least one level holder is configured to retain a level therein; and
    an interior surface, the interior surface defining a through opening extending through the top coupling portion and the bottom coupling portion of the clamp body,
        wherein at the top coupling portion, the interior surface comprises a substantially cylindrical surface,
        wherein at the bottom coupling portion, the interior surface comprises a substantially cylindrical surface and a stepped surface disposed in between the substantially cylindrical surface of the top coupling portion and the substantially cylindrical surface of the bottom coupling portion, and
        wherein the substantially cylindrical surface of the bottom coupling portion has a larger diameter than the substantially cylindrical surface of the top coupling portion.

17. The fixture clamp of claim 16, wherein the through opening is configured to receive a portion of the fixture at the top portion and configured to receive a portion of the support structure at the bottom portion.

18. The airfield light fixture of claim 9, further comprising a seal disposed between the housing and the globe clamp.

* * * * *